United States Patent [19]

Delajoud

[11] Patent Number: 4,669,317
[45] Date of Patent: Jun. 2, 1987

[54] DEVICES FOR THE VERY ACCURATE MEASUREMENT OF FLUID PRESSURES

[75] Inventor: Pierre Delajoud, Neuilly, France

[73] Assignee: Desgranges et Huot, Auberviliers, France

[21] Appl. No.: 853,031

[22] Filed: Apr. 17, 1986

[30] Foreign Application Priority Data

Apr. 22, 1985 [FR] France ................................. 85 06063

[51] Int. Cl.$^4$ ............................ G01L 7/16; G01L 9/10
[52] U.S. Cl. ........................................ 73/745; 73/701; 73/708
[58] Field of Search ................. 73/4 D, 708, 744, 745, 73/746, 701

[56] References Cited

U.S. PATENT DOCUMENTS

| | | | |
|---|---|---|---|
| 4,413,526 | 11/1983 | Delajoud | 73/745 |
| 4,491,016 | 1/1985 | Haefner | 73/745 |
| 4,541,285 | 9/1985 | Haefner | 73/745 |

Primary Examiner—Donald O. Woodiel
Attorney, Agent, or Firm—Cushman, Darby & Cushman

[57] ABSTRACT

A device is provided for the very accurate measurement of fluid pressures, comprising a vertical cylinder (2), a piston (1) adapted for sliding in this cylinder with viscous friction, the pressure to be measured being applied to the upper face (23) of the piston in an upper enclosure (22), means for rotating said piston in said cylinder, a precision electromagnetic dynamometric display balance (B) comprising a piece (3) to which the force to be measured is applied and means for transmitting to the piece of the balance the force applied to the piston by the pressure to be measured, with limitation of the maximum forces, a lower sealed enclosure (22a, 44A–44d), this lower enclosure being able to be evacuated or pressurized to a desired pressure (the atmospheric pressure or that of a fluid), and means for permanently supplying the clearance between the piston (1) and the cylinder (2) with fluid.

8 Claims, 11 Drawing Figures

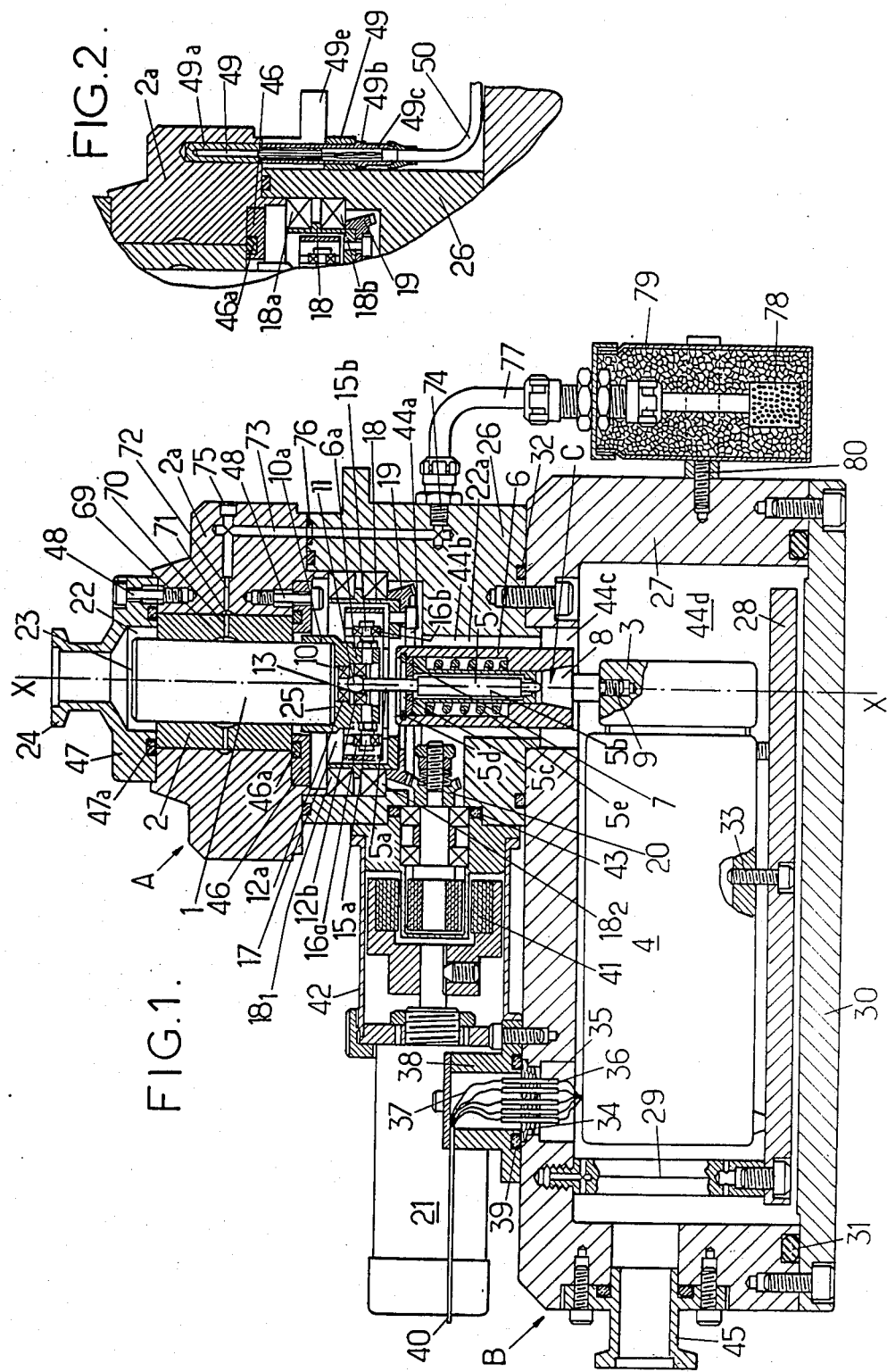

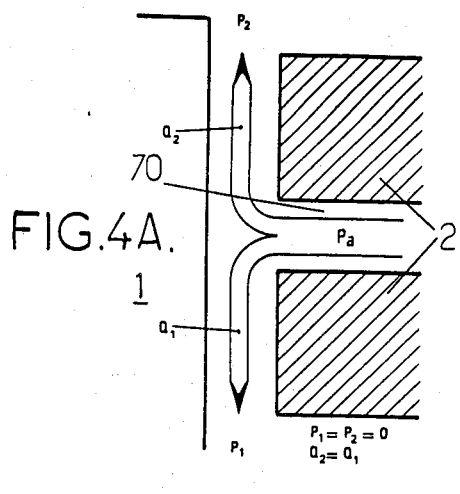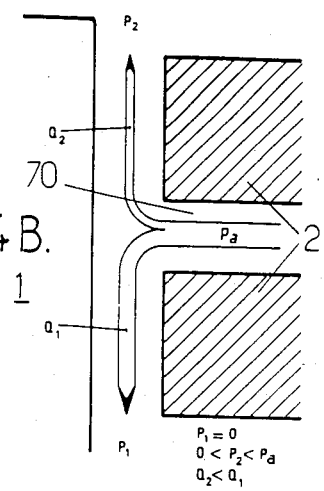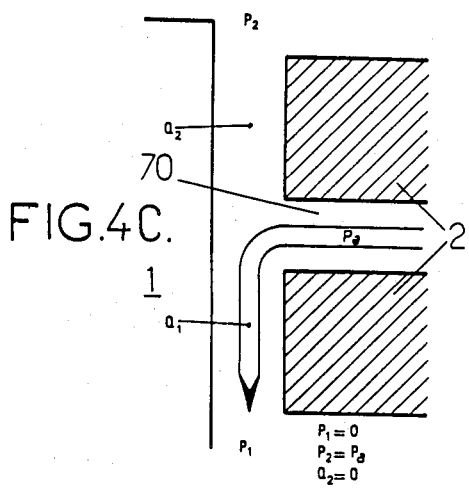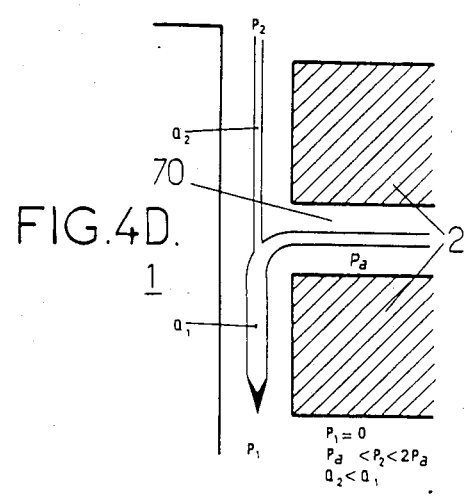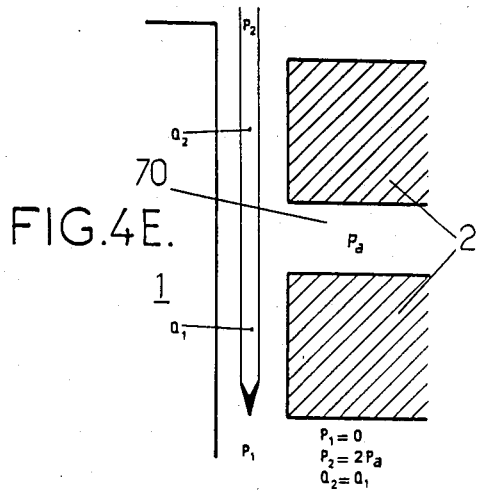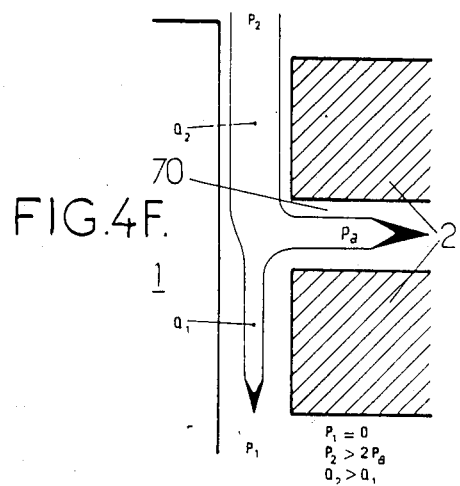

DEVICES FOR THE VERY ACCURATE MEASUREMENT OF FLUID PRESSURES

BACKGROUND AND SUMMARY OF THE INVENTION

The present invention relates to the measurement of the pressures of fluids, particularly gases, with very high precision.

It has as aim to provide an apparatus which allows the very accurate measurement to be made not only of an absolute pressure but also of a relative pressure (with respect to the atmospheric pressure), or even a difference of pressures (difference between the pressures of two fluids).

The apparatus of the invention may in particular form a pressure standard for checking and calibrating pressure gauges, or a pressure sensor or transmitter.

In French Pat. No. 2 481 801 filed by the applicant on the Apr. 30, 1980 a device was described for the very accurate measurement of fluid pressures with a display of the measured pressure, characterized by the fact that it comprises, in combination, a vertical cylinder, a piston adapted for sliding in this cylinder with viscous friction, the pressure to be measured being applied to the upper face of the piston, means for rotating said piston in said cylinder, a precision electromagnetic dynamometric display balance or scale comprising a shaft to which the force to be measured is applied and means for transmitting to said shaft of the balance the force applied to the upper face of the piston by the pressure to be measured, with limitation of the maximum forces.

The device of this prior French patent in fact measured a relative pressure, namely that of a fluid applied to the upper face of said piston, with respect to the atmospheric pressure which acted on the lower face of this piston.

Another device for measuring a relative pressure is described in the article published in the review Control and Instrumentation, vol. 11, No. 5 (London, May 1979), pages 29 and 31. This device, which is manufactured by one of the applicants, namely the firm DESGRANGES ET HUOT (whose initials are D & H), comprises means for rotating the piston in the measurement cylinder while providing good lubrication in the clearance between the rotating piston and the fixed cylinder by providing for example (FIG. 2B page 31 of this article) a receptacle connected by piping, on the one hand, at its lower part to said clearance and, on the other hand, at its upper part to a chamber disposed under the piston and connected to the pressure to be measured, said receptacle being partly filled with lubricant as well as the piping which connects the lower part of the receptacle to the clearance. In this device, the lower face of the piston which plunges in said chamber is subjected to the pressure to be measured, whereas the upper face of the piston is subjected to the ambient atmospheric pressure, which allows a differential pressure measurement to be made.

Furthermore, the European application No. 0 112 647 published on the July 4, 1984 describes a pressure measuring device comprising a piston to one end of which is applied the pressure to be measured and whose other end is applied against the mobile part of a precision balance, said piston being movable longitudinally in a sleeve which is rotated, the piston itself being secured against rotation. Such a device is in fact a variant of the device described in the above mentioned French Pat. No. 2 481 801, rotation of the piston in this cylinder provided for in this patent No. 2 481 801 being replaced by the rotation of the sleeve (serving as cylinder) about the piston in the European application No. 0112 647.

In these three prior documents (French Pat. No. 2 481 801, the article Control and Instrumentation and the European application No. 0112 647) the piston receives on one face the pressure to be measured whereas the other face of the piston acts on the mobile part of a precision balance (in the above cited patent and patent application), or else receives calibrated weights (above cited article). Thus a relative pressure measurement is made with respect to the atmospheric pressure.

Contrary to this prior teaching, the present invention aims at providing a standard of measurement of a fluid pressure, particularly the absolute pressure of a gas, by providing application of the pressure to be measured to the upper face of a pressure measuring piston, rotating in a cylinder, while applying to the lower face of the pressure measuring piston, depending on the desired application, either a vacuum (for carrying out an absolute pressure measurement), or the atmospheric pressure (for carrying out a relative pressure measurement, with respect to this atmospheric pressure), or another desired pressure (for carrying out a pressure difference measurement).

For this, the invention provides a device for the very accurate measurement of fluid pressures with a display of the measured pressures, comprising a vertical cylinder, a piston adapted for sliding in this cylinder with viscous friction, the pressure to be measured being applied to the upper face of the piston in an upper enclosure, means for rotating said piston in said cylinder, a precision electromagnetic dynamometric display balance comprising a piece to which the force to be measured is applied and means for transmitting to said piece of the balance the force applied to the piston by the pressure to be measured, with limitation of the maximum forces, which device is characterized in that it comprises, in combination with the cylinder-piston assembly; a lower sealed enclosure at the lower part of the cylinder-piston assembly, this lower enclosure being able to be evacuated or pressurized to a desired pressure (the atmospheric pressure or that of a fluid); and means for permanently supplying with fluid the clearance between the piston and the cylinder so as to ensure correct centering of the piston in the cylinder, even if said upper and lower enclosures are evacuated.

Preferably, said means are formed by an annular groove provided more especially at mid height of the cylinder and fed with clean and dry gas at the atmospheric pressure.

The device further comprises advantageously means for measuring the temperature at the level of a cylinder-piston assembly and means for correcting the value of the measured pressure as a function of its temperature.

BRIEF DESCRIPTION OF THE DRAWINGS

The invention will in any case be well understood from the complement of description which follows with reference to the accompanying drawings, which complement and drawings are of course given especially by way of indication.

FIG. 1 is a descriptive synthetic view of the active elements of the device, formed by sections through different vertical sectional planes, FIG. 2 is a partial section through a vertical plane showing the arrangement of the means, for correcting the influence of the temperature.

FIGS. 4a to 4f illustrate, in section, and on a larger scale, the piston-cylinder assembly, so as to facilitate the explanation of the operation of the means for permanently supplying with fluid the clearance between the piston and the cylinder for different measurement pressures, FIGS. 5 and 6 finally show, on a larger scale, respectively in section through a plane perpendicular to the axis XX and through VI—VI of FIG. 5, the system for rotating the piston.

DETAILED DESCRIPTION

Figure 3:
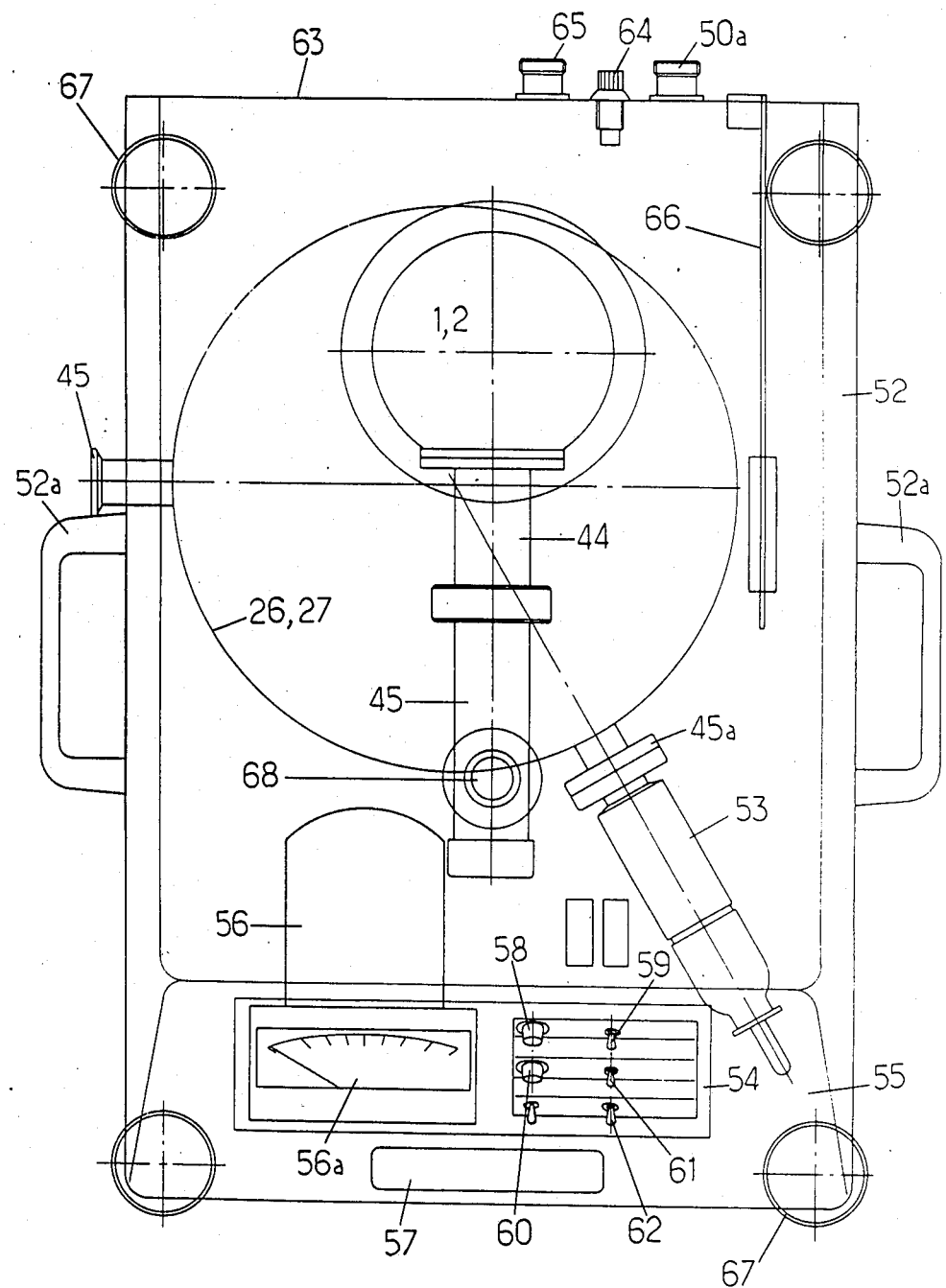
FIG. 3 is a schematical external view in a plan view illustration the arrangement of the different elements of the device.

According to the invention and more especially according to that of its modes of application, as well as those of the embodiments of its different parts to which it seems preference should be given, wishing for example to construct a device for the very accurate measurement of fluid pressures, the following or similar is how to set about it.

Referring to FIG. 1, the general structure of the pressure measurement device will first of all be outlined, which general structure comes within the scope of the above mentioned French patent.

The device comprises three main parts, namely: a part A comprising essentially the measuring element with a piston 1 and a cylinder 2; a part B forming an electromagnetic balance with a piece 3 intended to receive the force to be measured; and a connecting part C transmitting the force of piston 1 of assembly A to piece 3 of the balance B.

Part A comprises a first of all as indicated above, a vertical cylinder 2 and a piston 1 sliding in cylinder 2, the assembly of which forms the measuring element properly speaking, while ensuring the transformation of a pressure or a pressure difference in to a force which is transmitted by part C to the electromagnetic balance B.

The electromagnetic balance is formed by an electromagnetic rebalancing dynamometer, for example of the digital type, delivering a magnitude proportional to the force transmitted by piston 1, with digital display for direct and immediate reading and or transmission through an interface by a computer.

In FIG. 1, the coil of the dynamometer designated under the reference 4 has been shown schematically.

The translation connection, along a vertical axis XX, of piece 3 of the dynamometer (part B) with the piston 1 (of part A) is provided by a link 5 housed in a coupling block 6; an O-seal 7, sandwiched between link 5 and a socket 5b, provides flexible connection between link 5 and block 6, while allowing a slight angular movement of this link in this block.

The lower end of the coupling block 6 is provided with a conical recess with axis XX (the narrowed part of the truncated cone being directed upwardly) into which penetrates a truncated cone shaped piece 8 forming the connecting piece C and ending in a threaded rod 9 screwed into the piece 3 of the dynamometer. The upper part of coupling block 6 cooperates with the head 6a of piston 1 in which is provided a housing 10 followed by a recess 10a which grips round the lower end of the piston 1. A tungsten carbide ball 11 is in contact with the upper end of rod 5a of link 5, but not with piston 1. This ball 11 is disposed between an upper ball stop 12a which separates it from the piston 1 and which is mounted radially free so as to be centered on ball 1, and a lower ball bearing 12b which centers ball 11 with respect to the axis of piston 1.

Such an assembly ensures the transmission of forces, even considerable forces, between piston 1 and link 5 without any risk of damage or induction of axial noises.

A washer 13 retains the ball stop 12a in the head 6a of the piston, whereas the ball bearing 12b ensures centering of ball 11 with respect to the piston head 6a. This bearing 12b, except its inner ring, is rotatable, with the piston head 6a and the piston 1 itself, about the inner ring of this bearing which is secured against rotation, as well as ball 11 which this inner ring surrounds.

With such an arrangement, piston 1 rotates freely while ensuring the transmission of vertical translational forces to the link 5 first of all and, through this latter, the truncated cone shaped piece 8 and the threaded rod 9 to piece 3 of the dynamometer.

Figure 6:
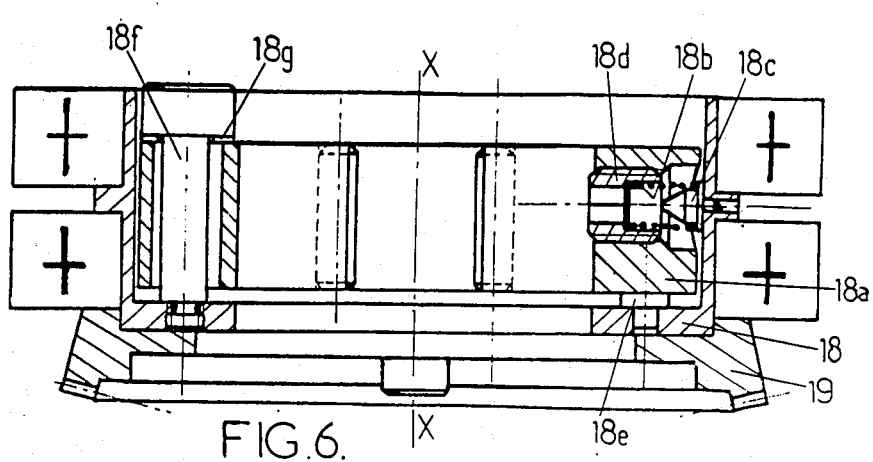
Figure 5:
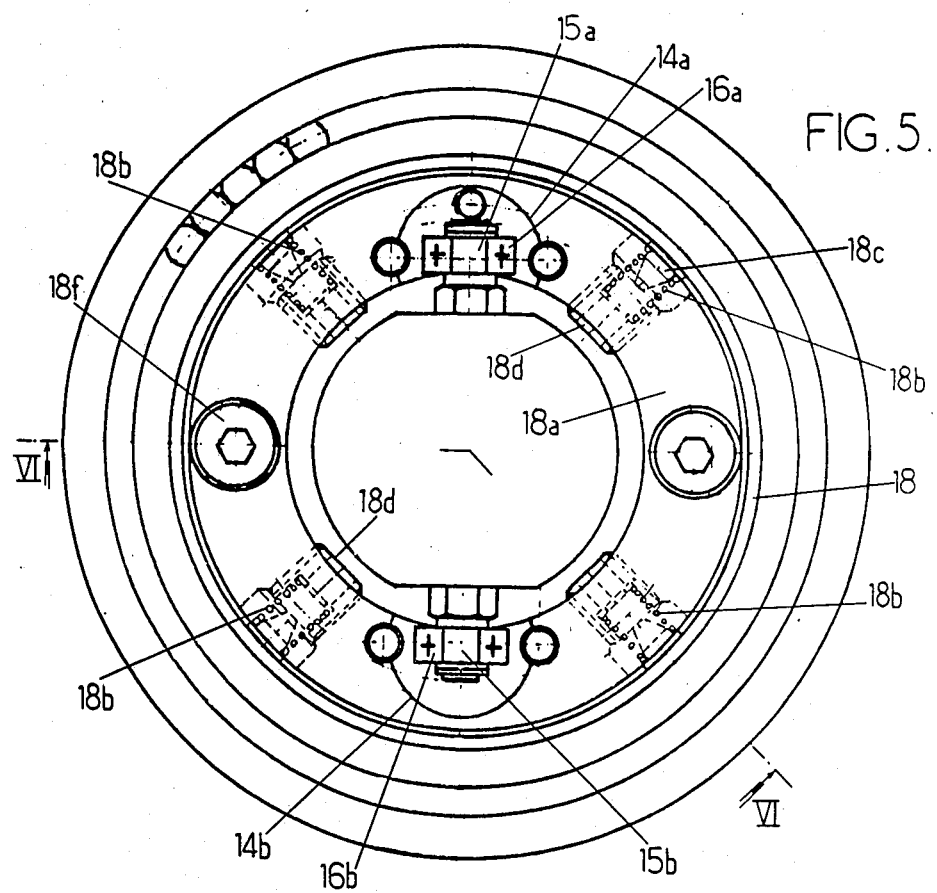

Rotation of piston 1 is provided (see FIGS. 1, 5 and 6) by means of two fingers 15a, 15b mounted on the piston head 6a; each finger 15a, 15b is equipped with a bearing 16a, 16b, each finger, locked for rotation about axis XX with a piston head 6a being able to slide freely in a housing 17 formed in a pulley 18; such sliding ensures the freedom of fingers 15 to move in translation along the axis XX of piston 1. Pulley 18 to which is fixed a crown gear 19 is bored for receiving an inner crown wheel 18a, the clearance between parts 18 and 18a being sufficient to allow radial movement of crown wheel 18 with respect to its housing: four springs 18b, disposed on the form of a cross, hold the crown wheel 18a centered in pulley 18.

Each spring 18b is positioned, on the pulley 18 side, on a stud 18c and is centered, on the crown wheel 18a side, in the bore formed in a screw 18d which allows the prestress of the spring to be adjusted.

Crown wheel 18a rests on four shoes 18e (made from polytetrafluorethylene for example). Two shouldered screws 18f define the axial functional clearance between crown wheel 18a and pulley 18, without hindering the relative radial movement of the two parts. A polytetrafluorethylene washer 18g is placed under the head of each screw 18f.

In crown wheel 18a are formed two housings 14a, 14b which receive the drive fingers 15a, 15b and their bearings 16a, 16b.

The system thus defined ensures a symmetric double contact between the inner crown wheel 18a and the piston head 6a, independently of machining dispersions. Washers 18g and shoes 18e limit the contact friction between crown wheel 18a and pulley 18.

With such an assembly the pivoting torque applied by the rotating drive fingers 15a, 15b is cancelled out or at least limited.

Moreover, for limiting the force transmitted to coil 4 so as to avoid damage thereof, link 5 exerts the force, which is imparted thereto by piston 1, on a socket 5b guided by a double bore in the coupling block 6. A washer 5c, held by a circlip 5d, limits the upward translational movement of socket 5b and link 5.

A spring 5e, surrounding socket 5b, bears at one end on the coupling block 6 and, at the other end, on a shoulder of socket 5b. It prevents the downward translational movement thereof for a force defined by the stiffness and prestress of spring 5e.

When the force applied by link 5 is greater than six kilograms for example, the socket compresses spring 5e. The bearings of the drive fingers 15a, 15b come into abutment against pulley 18.

The gear wheel 19 meshes with a bevel gear driven in rotation by an electric motor 21, a step down of the rotational speed of motor 21 being transmitted by assembly 20-19 to the pulley 18 and so to piston 1. Two bearings $18_1$, $18_2$ are provided for ensuring easy rotation of pulley 18.

The structure which has just been described overcomes any defect of alignment between piece 3 of the dynamometer and the pressure measuring piston 1 while ensuring rotation of this piston at a rotational speed lower than that of the motor 21; such a structure further isolates piston 1 from the effects, particularly vibrations, generated by the moving parts.

In fact, piece 3, the coupling block 6, link 5, link 11 and the outer ring of bearing 12b (ring which guides the ball) form the parts secured against rotation but movable in vertical translation of the assembly of parts transmitting the force of the piston to the dynamometer; on the other hand, piston 1, its head 6 and bearing 12b, except for its inner ring, form the rotating parts of this assembly transmitting the force of the piston to the coil.

In so far as the structure of the dynamometer and its self calibrating is concerned, reference may be made to the above mentioned French patent No. 2 481 801.

As in this prior patent, standard masses are used corresponding to the maximum range of the dynamometer for adjusting the measurement range or scale as a function of the local earth's gravity and of the pressure/force conversion coefficient of the measuring assembly (piston 1 - cylinder 2) used; these standard masses also allow the linearity of the dynamometer to be checked.

A description will now be given of how it is possible, with the device of the invention, to carry out absolute measurements or differential measurements, after however remarking that, as in the device of the above mentioned patent, the pressure to be measured (absolute pressure with respect to a vacuum or relative pressure) is applied to the upper enclosure 22 above the upper face 23 of piston 1, a flange 24 providing connection with the source of pressure to be measured. The lower enclosure defined hereafter, into which the lower part of piston 1 plunges with its lower face 25, receives the reference pressure which may be either a vacuum, or the atmospheric pressure, or a second pressure in the case where it is desired to measure the difference between the pressures applied to the upper face 23 and to the lower face 25 of piston 1.

In accordance with the invention, the lower enclosure which must be able to be evacuated or placed under a well defined desired pressure is sealed.

The lower enclosure 22a, 44a–44d is formed in two parts, namely:
- an intermediate body 26 in which is housed a part described above of the means for transmitting the rotation of motor 21 to piston 1, as well as a part of the means for transmitting the linear movement of piston 1 to piece 3, which part was also described above,
- a main body 27 which contains the active part of the dynamometer (piece 3 and coil 4).

The assembly 3-4 is mounted "in the air" on a base plate 28 fixed by three columns 29 (disposed in a triangle) to the main body 27. A bottom 30 closes the main body 27, an O-seal 31 providing sealing between the main body 27 and bottom 30; similarly an O-seal 32 provides sealing between the intermediate body 26 and the main body 27. The removable assembly of bottom 30 provides good accessibility to the coil of the dynamometer, an adjustment screw 33 permitting the coil 4 to be fixed in the correct position on plate 28.

The electric connection between coil 4 of the dynamometer and the electronics of the dynamometer is provided by means of a glass cup 34 through which pass pins 35 to which the connecting wires 36 and 37 are connected between the coil of the dynamometer and the electronics thereof. A flange 38 covers the glass cup 34, an O-seal 39 providing sealing for the passage of the electric connections which finally leave in the form of a harness 40.

Moreover, the external electric motor 21 ensures driving of the toothed pinion 20 through a magnetic coupling 41 with purely radial magnetizing effect thus causing no axial reaction on said pinion, which limits friction losses; the magnetic coupling also ensures the function of torque limiter and so of protection for the electric motor 21 in the case of an overload. The magnetic coupling 41 is housed in a case 42, an O-ring 43 providing sealing between case 42 and the intermediate body 26.

It can then be seen that the volume of the lower enclosure in pieces 26 and 27 has been reduced to a minimum; it is essentially formed by the spaces 44a, 44b, 44c and 44d. This facilitates evacuation of the reference enclosure when it is desired to carry out absolute pressure measurements.

Advantageously, all the screws and the columns are bored which, if they imprisoned gas, would slow down evacuation of the lower enclosure. As for the O-seals providing sealing of the enclosure, they are coated with a silicon grease which, while completing the sealing, has an excellent behavior with respect to the vacuum because of its low vapor tension.

Coupling of the lower enclosure 22a, 44a–44d is provided by two flanges, only one 45 of which is visible in FIG. 1, this flange 45, fixed to the main body 27, projecting outwardly and being intended for connection to a vacuum pump, to the atmospheric pressure or to a pressure with respect to which it is desired to measure a pressure applied to the upper flange 24, whereas the other flange 45 (shown in FIG. 3) is connected to a vacuum gauge whose indications are displayed by a vacuum indicator visible on the front face of the casing (see hereafter, with reference to FIG. 3).

The lower enclosure 44a–44d which has just been described has the following characteristics which allow precision measurement (absolute, relative or differential, depending on the case) to be made of the pressure applied to the upper face 23 of the piston 1 by flange 24:
- it is sealed while being readily dismountable,
- it does not hinder the adjustment of the coaxiality between the axis of piece 3 and the axis of piston 1,
- it allows the passage of electric information between coil 4 of the dynamometer and its electronics,
- it allows rotation of piston 1 to be transmitted without sealing loss,
- removal of gas therefrom is easy when it is desired to place it under a vacuum for carrying out an absolute pressure measurement,
- it has a connection for application of a desired reference pressure,
- it has a take off for connecting a vacuum probe for assessing the residual vacuum.

Returning now to piston 1 and cylinder 2, it will be noted that they are preferably made from tungsten carbide. Several piston-cylinder sets are provided, these sets being differentiated from each other by the value of the section of the piston and so of the bore of the cylinder.

These piston-cylinder assemblies define different pressure ranges, the increase of the pressure range causing of course a reduction of the sensitivity of the digital display of the measured pressure or pressure difference. On the other hand, the external dimensions of the cylinder of the different sets are identical, thus allowing the different sets in piece 2a of the device which receives the cylinder to be exchanged.

Changing a piston-cylinder assembly may be carried out without having to remove the two pieces of this assembly, which is very advantageous, for otherwise cleaning thereof would raise difficult problems. This assembly is therefore unitary and cylinder 2 is held in its housing in part 2a by means of two lower 46 and upper 47 flanges fixed by screws which cannot be lost 48. These flanges each comprise an O-seal 46a, 47a. The upper flange 47 which comprises the connection 24 is made preferably from stainless steel so as to withstand the numerous forces applied to it.

The measurement of absolute pressures is particularly interesting for low values (less than 10 bars). Beyond, it is simpler to break down the measurement into a high precision relative pressure measurement and an absolute pressure measurement, that of the atmospheric pressure. The sum of the two gives the desired absolute pressure. That conditioned the choice of a piston-cylinder assembly operating with gas without greasing. This mode of operation ensures good mobility of the piston despite the low values of the pressures.

So that the piston is correctly recentered, the clearance between the cylinder and the piston must be permantently supplied. A particular arrangement allows this function to be ensured whatever the type of operation. That prevents the piston from jamming in the cylinder.

We will describe this particular arrangement hereafter with reference to FIGS. 4A to 4F, but before explanations concerning the whole of the device will be given with reference to FIGS. 2 and 3.

For increasing the accuracy of the pressure measurement, the temperature of the measurement should advantageously be taken into account, for temperature variation causes the piston-cylinder assembly to expand to a greater or lesser degree, which modifies the value of the real effective section of the piston.

On this subject, as well as on the subject of the normal pressure/force conversion coefficient, reference may be made to the above mentioned patent no. 2 481 801.

The temperature is measured by means of a temperature proble 49 (FIG. 2) which is as close as possible to the piston 1-cylinder 2 assembly, without being fixed thereto.

Probe 49 is introduced into a copper end piece 49a itself fitted in a tube 49b. A heat retractable sheath 49c protects the wires of the probe and grips round the free end of tube 49b. The whole is bonded in a support bar 49d which, through lockable screws, can be mounted in the air under the collar 49e of the intermediate body 46. An aperture allows the probe to project.

This temperature probe 49 allows the value of the pressure to be corrected by calculation through a processor which receives, on the one side, the digital measurements from the dynamometer through the above mentioned interface, and, on the other side, through another interface (possibly integrated with the first interface) the digital indications of a digital voltmeter, not shown, connected by a cable 50 to the temperature probe 49. THe processor thus gives at all times the corrected digital value of the absolute, relative or differential pressure which it is desired to measure.

Referring now to FIG. 3, the general construction of the device which has been described will be explained with reference to FIGS. 1 and 2.

The device is suspended in a casing 52 by means of three screws, isolation from vibrations being provided by a washer made from an isolating material from the vibrational point of view, for example from "Klingerit" disposed between the intermediate body 26 and casing 52, as well as by means of three shouldered rings for example made from "Rylsan", mounted on the three fixing screws.

In FIG. 3, the piston 1-cylinder 2 measuring station, the magnetic coupling 44, the electric drive motor 45 and the intermediate body 26 - main body 27 assembly have been shown schematically.

The vacuum gauge is illustrated at 53 and it is connected directly to flange 45a (which is supported like flange 45 by the main body 27).

A control plate 54 is carried by the front sloping face 55 of casing 52. The control plate 54 comprises a vacuum indicator 56 with a dial 56a on the one hand and a series of switches and indicator lights on the other; it is a question of an indicator light 58 and a switch 59 for controlling the starting up of the device, an indicator light 60 and a switch 61 for controlling the switching on of the vacuum indicator 56 and finally a switch 62 for resetting the display, this switch being used during calibration of the device.

The rear face 63 of the device comprises a closure plate which clips onto the casing properly speaking 72. This closure plate encloses a bracket carrying the electric connections, namely the output 50a for reading the temperature probe and for reading the residual pressure, a fuse 64 protecting the electric system of the device, an output 64 for connection to the mains and finally a double interface 66 for connection of the device to a processor determining the value of the pressure corrected for the influence of the temperature displayed digitally in window 57.

A printed circuit, placed under the main body provides connection between the different electric elements.

Four setting screws 67 allow the verticality of the access of the piston to be adjusted on the basis of the indications of a spirit level 68 placed on the top of the apparatus.

Two handles 52a are provided for lifting. They are placed so that the mass of the apparatus is equally distributed.

The overall dimensions of the apparatus are: height 290 mm; width 400 mm; length 490 mm.

Referring again to the piston 1-cylinder 2 measuring assembly, as pointed out above, piston 1 which is mobile vertically in translation (along the axis XX) in the bore of cylinder 2 and which is rotated about its axis XX by the motor 21, is subjected on its two faces, upper 23 and lower 25, to the pressures which reign respectively in the upper enclosure 22 and in the lower enclosure 44a, 44b, 44c, 44d.

The pressure which reigns in enclosure 22 is the pressure which is to be measured either in an absolute way when a vacuum reigns in the lower enclosure, or in a relative way when the atmospheric pressure reigns in the lower enclosure; furthermore, a pressure difference may also be measured, namely between the pressure of a first fluid arriving into the enclosure 22 through flange 24 and that of a second fluid arriving in the lower enclosure 44a, 44d through flange 45. The pressure (zero, atmospheric or of a second fluid) reigning in the lower enclosure 44a–44d will henceforth be called reference pressure $P_1$, whereas the pressure reigning in the enclosure 22 will be called pressure to be measured $P_2$, and similarly enclosure 22 will be called measuring enclosure and enclosure 44a–44d reference enclosure.

In the absence of particular measurements:
 on the one hand, the leak of gas between the measuring enclosure and the reference enclosure through the clearance existing between the piston 1 and cylinder 2, depends on the value of the measuring pressure; the higher this latter, the higher the flow through the clearance; this flow disturbs the value of the reference pressure; and
 on the other hand, during calibration of the dynamometer, it is necessary to place the two upper and lower enclosures at the value of the reference pressure namely a vacuum; the very principle of piston 1 rotating in a cylinder 2 requires the permanent flow of a fluid which avoids any contact between the cylinder and the piston; recentering of the piston, driven in rotation, is provided by the leaking fluid; if this latter were to disappear, piston 1 would inevitably jam in cylinder 2.

In particular, when an absolute pressure less than 10 millibars or so is introduced into the measuring enclosure, the piston risks jamming.

The purpose of the present invention, in so far as the measuring assembly is concerned, is to avoid:
 when the reference enclosure is evacuated, its residual pressure from depending on the pressure introduced into the measuring enclosure;
 the measurements of low pressures such as vacuum calibration from jamming the piston in its cylinder.

Thus, the invention provides a supply of gas in the clearance between piston 1 and cylinder 2, so that the supply:
 ensures a flow of gas in the clearance, whatever the type of operation might be; and
 supplies a clean and dry gas, an impurity being able to cause jamming of the piston, whereas traces of humidity, by polluting the piston, risk disturbing the measurement.

To achieve the above mentioned aims, the bore of cylinder 2 comprises a circular groove 69, for example at mid height of cylinder 2, as well as an annular groove 71 in piece 2a at the same level as groove 69. These two grooves communicate through one or more (in particular 2) channels 70 formed in cylinder 2. Channels 72 and 73, perpendicular to each other, place the annular groove 71
 and so the annular grooves 69 (because of channel 70) in communication with a threaded outlet 74 formed in the intermediate body 26. A bonded plug 75 is provided for possible cleaning purposes, whereas an O-seal 76 provides sealing of channel 73 at the passage of piece 2a through the intermediate body 26.

A flexible tube 77 is fixed to the outlet 74: this flexible tube 77 ends in a filter 78 which plunges into a flask 79 containing crystals of a desiccating product. Flash 79 is fixed by bolts 80 to the main body 27 and, for the intake of the atmospheric air, comprises orifices.

Because groove 69 is situated, in the example, at an equal distance from the ends of cylinder 2 and because the clearance between piston 1 and cylinder 2 is the same over the whole length of the cylinder by construction, the flow in this clearance is proportional to the difference between the pressure of the gas in groove 69, namely the atmospheric pressure $P_a$ and that of the upper or lower end concerned.

If we call $Q_1$ the flow in the lower part of the clearance and $Q_2$ the flow in the upper part of the clearance, i.e. respectively below and above groove 69 and each channel 70, $Q_1$ is proportional to $P_1 - P_a$, whereas Q is proportional to $P_2 - P_a$, $P_1$ and $P_2$ being greater or smaller than the atmospheric pressure $P_a$.

The role of the arrangement which has just been described in detail for providing infallible rotation of piston 1 in cylinder 2 will now be described with reference to FIGS. 4A, 4B, 4C, 4D, 4E and 4F which correspond to different values of the pressure $P_2$ to be measured, which values increase progressively from FIGS. 4A to 4F, whereas the pressures $P_a$ and $P_1 = 0$ remain constant and zero.

FIG. 4A

This Figure relates to the calibration of the dynamometer for which the measuring enclosure 22 and the reference enclosure 44a–44d are both at zero pressure being connected together and evacuated. Two faces 23 and 25 of the piston are then subjected to the same pressure and the flow rate $Q_1$ and $Q_2$ in the two lower and upper half clearances of the piston 1-cylinder 2 assembly are identical and of opposite directions, since the pressure difference between the supply (pressure $P_a$) and the ends ($P_1$ $P_2$) is equal to an atmosphere: $P_a - P_1 = P_a - P_1 = 1$ m.

FIG. 4B

The pressure $P_2$ in the measuring enclosure is now greater than the pressure $P_1 = 0$ in the reference enclosure, while remaining less than the atmospheric pressure $P_a$.

The flow $Q_2$ in the case of FIG. 4B, decreases with respect to the flow $Q_2$, in the case of FIG. 4A, proportionally to the difference between the pressure $P_2$ and zero pressure.

On the other hand, flow $Q_1$ remains unchanged for the pressure difference between each channel 70 and the reference enclosure has not changed with respect to FIG. 4A.

Finally, the supply flow rate $Q_1 + Q_2$ for channels 70 decreases at the same time as the flow rate $Q_2$.

FIG. 4C

With the pressure $P_2$ continuing to increase, it reaches the atmospheric pressure $P_a$. In this case, the flow $Q_2$ is zero because $P_2 = P_a$. As for the flow $Q_1$, it remains unchanged with respect to flow $Q_1$ of FIGS. 4A and 4B, since $P_a$ and $P_1$ have not changed.

As can be seen in FIG. 4C, the whole supply flow rate passes entirely through the lower part of the clearance (flow $Q_1$), no flow taking place in the upper part of this clearance ($Q_2 - 0$).

FIG. 4D

Now the pressure $P_2$ (which continues to increase) exceeds the atmospheric pressure $P_a$ while remaining less than twice the atmospheric pressure $2P_a$.

The flow in the upper half clearance has changed direction, flow $Q_2$ being no longer zero; flow $Q_1$ remaining unchanged for the same reasons as above, the supply flow rate decreases since the flow $Q_2$ is added thereto for forming the flow $Q_1$.

FIG. 4E

The pressure $P_2$ is now equal to twice the atmospheric pressure: $P_2 = 2 P_a$.

The pressure difference to which the upper half clearance is subjected is equal to the atmospheric pressure and so the flow $Q_2$ is equal to flow $Q_1$. The result is that the supply flow rate is zero in each channel 70.

FIG. 4F

With pressure $P_2$ continuing to increase it is now greater than twice the atmospheric pressure.

Thus the flow $Q_2$ is greater than flow $Q_1$ and the flow in each channel 70 is reversed.

It will be noted that in all the FIGS. 4A to 4F for which a vacuum reigns in the lower enclosure and the atmospheric pressure in each channel 70, the flow $Q_1$ is always the same, whatever the value of the measuring pressure $P_2$.

The disturbance created by this flow at the level of the reference pressure is constant. It may be determined and may be taken into account.

In all cases gas especially is present between piston 1 and cylinder 2, thus avoiding jamming of the piston by rupture of the fluid film in the clearance between the piston and the cylinder.

It will be noted that when the measuring pressure $P_2$ is greater than several times the atmospheric pressure, for example more than ten times greater than the atmospheric pressure, it is advantageous to carry out a relative measurement (with respect to the atmospheric pressure) and to determine the exact value of this atmospheric pressure.

As is evident and as it follows moreover already from what has gone before, the invention is in no wise limited to those of its modes of application and embodiments which have been more especially considered; it embraces, on the contrary, all variants thereof.

I claim:

1. A device for the very accurate measurement of fluid pressures with display of the measured pressure, comprising a vertical cylinder (2), a piston (1) adapted for sliding in this cylinder with viscous friction, the pressure to be measured being applied to the upper face (23) of the piston in an upper enclosure (22), means for rotating said piston in said cylinder, a precision electromagnetic dynamometer display balance (B) comprising a piece (3) to which the force to be measured is applied and means for transmitting to the piece of the balance the force applied to the piston by the pressure to be measured, with limitation of the maximum forces, said device further comprising:

a lower sealed enclosure (22a, 44a-44d) at the lower part of the cylinder-piston assembly, this lower enclosure being able to be evacuated or pressurized to a desired pressure, the atmospheric pressure or that of a fluid, and means for permanently supplying with fluid the clearance between the piston (1) and the cylinder (2) so as to provide correct centering of the piston in the cylinder, even if the upper and lower enclosures mentioned above the evacuated.

2. Device according to claim 1, wherein said means for supplying said clearance with fluid are formed by an annular groove (69) provided in the cylinder and means for supplying said annular groove with clean and dry gas at constant pressure, such as the atmospheric pressure.

3. Device according to claim 2, wherein said means for supplying said annular groove with clean and dry gas comprise an annular groove (71) formed on the periphery of a piece (2a) which surrounds said cylinder (2) and which is in communication, on the one hand, with said annular groove (69) and, on the other hand, with channels (70, 72, 73) bored in the device and fed from a receptacle (79) containing a product which retains the humidity and a product which filters the impurities, this receptacle being supplied with atmospheric air.

4. Device according to claim 1, further comprising resilient means (5e) for limiting the force transmitted from the piston (1) to the piece (3) of the balance (B).

5. Device according to claim 1, further comprising means (49) for measuring the temperature at the level of the cylinder-piston assembly and means for correcting the value of the measured pressure as a function of this temperature.

6. Device according to claim 1, further comprising a magnetic coupling (41) between the motor (21) driving the piston (1) in rotation and the mechanical means integral with this piston and rotated therewith.

7. Device according to claim 5, further comprising at least one connecting interface with a processor receiving the digital indications from the dynamometer balance and the indications for said temperature measuring means (49).

8. Device according to claim 1, further comprising symmetric flexible mechanical drive means (14a, 14b; 15a, 15b; 16a, 16b; 18b, 18c, 18d, 18e, 18f, 18g) between the motor (21) and the piston (1).

* * * * *